United States Patent [19]

Pouchol et al.

[11] Patent Number: 4,731,294

[45] Date of Patent: Mar. 15, 1988

[54] ORGANOPOLYSILOXANE COATING COMPOSITIONS HAVING IMPROVED HARDNESS

[75] Inventors: Jean-Marie Pouchol, Lyons; Louis Gros, Solaize, both of France

[73] Assignee: Rhone-Poulenc Specialites Chimiques, Courbevoir, France

[21] Appl. No.: 859,708

[22] Filed: May 5, 1986

[30] Foreign Application Priority Data

May 3, 1985 [FR] France ................ 85 06734

[51] Int. Cl.[4] ................ B32B 9/04
[52] U.S. Cl. ................ 428/447; 428/450; 524/441; 524/493; 524/267; 528/15; 528/14; 528/18; 528/43; 427/387; 427/388.1

[58] Field of Search ........ 524/441, 493, 267; 528/18, 15, 14, 43; 427/387, 388.1; 428/447, 450

[56] References Cited

U.S. PATENT DOCUMENTS 2,743,192  4/1956  White ................ 427/379

*Primary Examiner*—Melvyn I. Marquis
*Attorney, Agent, or Firm*—Burns, Doane, Swecker & Mathis

[57] ABSTRACT

Methylphenylsiloxane coating compositions comprising silica fillers and aluminum particulates, e.g., matte paints, are well adopted for the provision of hard non-adhesive finishes, e.g., on kitchen utensils.

11 Claims, No Drawings

ORGANOPOLYSILOXANE COATING COMPOSITIONS HAVING IMPROVED HARDNESS

BACKGROUND OF THE INVENTION

1. Field of the Invention

The present invention relates to novel organopolysiloxane compositions and matte paints formulated therefrom, and, more especially, to such compositions/paints comprised of methylphenylpolysiloxane resins, and specified amounts of finely divided aluminum and silica powders. Coatings can be produced from the subject compositions which have improved hardness when heated.

2. Description of the Prior Art

Organopolysiloxane resins pigmented with aluminum powder have been known since the beginning of the silicone art. Compare, in particular, U.S. Pat. Nos. 2,709,558, 2,743,192, 4,289,677, French Pat. Nos. 1,213,487, 1,387,725, 1,393,728, British Pat. Nos. 818,301, 1,179,127, German Pat. No. 2,046,385 and published Japanese Application Nos. 55/068,695 and 55/165,963.

Especially compare U.S. Pat. No. 2,743,192 and the Japanese Application No. 55/068,695, which describe the addition of inorganic fillers such as silicas to mixtures consisting of organopolysiloxane resins and aluminum powders.

More precisely, U. S. Pat. No. 2,743,192 relates to coating compositions comprising 100 parts of a methylphenylpolysiloxane resin which is soluble in organic solvents, 70 to 125 parts of a flaky aluminum pigment, 12 to 20%, based on the aluminum pigment, of a refractory filler principally selected from among titanium oxide, alumina, silica and zirconium oxide, and 60 to 300 parts of organic solvents. The aluminum pigment and the refractory filler consist of particles, a high proportion of which pass through sieves containing 325 mesh per inch. Example 4 illustrates the use of a silica having a mean particle diameter of 44 $\mu$m; coatings produced from these compositions are said to have improved heat resistance.

With reference to Japanese Application No. 55/68,695, this also relates to coatings which have good thermal resistance and which are intended to protect printed circuits. These coatings are prepared from silicone resins combined with finely divided fillers such as titanium oxide, aluminum, clay, silica and talc. The examples provide little information concerning the nature of the silicone resins, or of their concentration within the commercial formulations employed; however, more detailed information is provided concerning the amounts of fillers added. Thus, Example 1 describes a composition continuing 3 parts of silica having a specific surface of 200 m$^2$/g, 10 parts of iron oxide, and 80 parts of a silicone resin, ×400 and Example 2 describes a composition containing 25 parts of an aluminum paste and 69.4 parts of a silicone resin, KR 201.

U.S. Pat. No. 2,743,192 and Japanese Application No. 55/68,695 describe certain combinations of silicone resins with inorganic fillers and/or aluminum powder for the production of coatings having good thermal resistance. They do not describe any means to be used to provide coatings which retain good hardness when heated, that is to say, which are essentially devoid of thermoplasticity.

The elimination of thermoplasticity is much sought after in the case of nonadhesive coatings, based on silicone resins, which are deposited onto articles which are used when they are heated, such as cooking utensils. It is obvious that if the coatings are readily torn off, stripped or become unstuck or perforated, they are no longer useful to impart a non-adhesive nature to articles which are in continual contact with sticky or crust-forming products which are formed when food is being cooked. Serious need thus exists in this art for coatings which do not soften when heated, and which are cheap and easy to apply, especially in the field of nonadhesion to foodstuffs.

SUMMARY OF THE INVENTION

It has now unexpectedly been found that mixtures of silicone resins with specified amounts of finely divided silica and aluminum powders make it possible to provide matte coatings of silicone resins which retain good hardness when heated.

Briefly, the present invention features organopolysiloxane compositions well adopted for the provision of such coatings, which organopolysiloxane compositions comprise:

(A) 100 parts by weight of a methylphenylpolysiloxane resin, dissolved in an organic solvent and comprising recurring structural units of the formulae $CH_3SiO_{1.5}$, $(CH_3)_2SiO$, $(C_6H_5)CH_3SiO$, $C_6H_5SiO_{1.5}$, and $(C_6H_5)_2SiO$, distributed in accordance with a $C_6H_5/Si$ ratio of 0.3 to 0.85 and a $(C_6H_5+CH_3)/Si$ ratio of 1.1 to 1.65, and having a concentration of hydroxyl groups bonded to silicon atoms of 0.5 to 9%;

(B) 3 to 25 parts by weight of finely divided silicas having a BET specific surface of at least 40 m$^2$/g; and (C) 5 to 45 parts by weight of aluminum powder; with the proviso that the weight ratio $[(B)+(C)]/(A)$ ranges from 0.15 to 0.50.

DETAILED DESCRIPTION OF THE PREFERRED EMBODIMENTS OF THE INVENTION

More particularly according to the present invention, the methylphenylpolysiloxane resin (A) comprises, as indicated above, recurring units of the formulae $CH_3SiO_{1.5}$, $(CH_3)_2SiO$, $(CH_3)(C_6H_5)SiO$, $C_6H_5SiO_{1.5}$ and $(C_6H_5)_2SiO$; these recurring units are not combined in any manner that may be. Indeed, they must provide a $C_6H_5/Si$ ratio of 0.3 to 0.85, preferably 0.40 to 0.80, and a $(CH_3+C_6H_5)/Si$ ratio of 1.1 to 1.65, preferably 1.20 to 1.60. In addition, they contain from 0.5 to 9%, preferably 0.6% to 8.5%, of hydroxy radicals bonded to silicon atoms.

In the previous description and in that which follows, the % and contents are by weight, unless otherwise indicated.

The various methods for the preparation of these resins are well-known to this art. They typically consist of cohydrolyzing silanes of the formulae $CH_3SiX_3$, $(CH_3)_2SiX_2$, $CH_3(C_6H_5)SiX_2$, $C_6H_5SiX_3$ and $(C_6H_5)_2SiX_2$, in which the symbol X denotes a halogen atom, preferably a chlorine atom. Some alkoxy radicals may be bonded to the silicon atoms in these silanes, not more than 20% relative to the total radicals X; they contain from 1 to 4 carbon atoms and are preferably methoxy, ethoxy, n-propoxy and isopropoxy radicals.

The mixture of silanes to be cohydrolyzed necessarily contains specified proportions and a specified choice of these silanes, such that the recurring units are provided therein in the ratios specified earlier, namely, a $C_6H_5$/Si ratio of 0.3 to 0.85 and a $(CH_3+C_6H_5)$/Si ratio of 1.1 to 1.65.

Exemplary of such mixtures, the following are representative:

(i) $CH_3SiC_3$ (1 mole), $(CH_3)_2SiCl_2$ (1 mole) and $C_6H_5SiCl_3$ (1.5 mole);

(ii) $CH_3SiCl_3$ (1 mole), $(CH_3)_2SiCl_2$ (1 mole), $(C_6H_5)SiCl_3$ (1 mole) and $(C_6H_5)_2SiCl_2$ (1 mole);

(iii) $CH_3SiCl_3$ (1.5 moles), $(CH_3)_2SiCl_2$ (1 mole) and $(C_6H_5)(CH_3)SiCl_2$ (2 moles);

(iv) $(CH_3)_2SiCl_2$ (2 moles) and $C_6H_5SiCl_3$ (3 moles).

Cohydrolysis is carried out in appropriate solvents, those used most commonly being poorly miscible or immiscible with water. Such solvents include:

(a) aromatic hydrocarbons such as toluene, xylene, cumene, tetralin and decalin, (b) aliphatic and alicyclic hydrocarbons such as hexane, heptane, octane, dodecane, cyclohexane and methylcyclohexane, (c) esters of monocarboxylic acids and aliphatic monoalcohols, such as n-butyl acetate and 2ethylhexyl acetate, (d) aliphtic ethers such as isopropyl ether and n-butyl ether, and (e) aliphatic and alicyclic ketones such as acetone, methyl ethyl ketone, cyclohexanone and methylcyclohexanone.

The ketones are not used in and of themselves, but in combination with other, nonketonic solvents, in a proportion which does not exceed 50 parts per 100 parts of nonketonic solvents.

From 50 to 500 parts of solvents may be used per 100 parts of silanes to be cohydrolyzed.

The cohydrolysis operation can be carried out by adding the halosilanes dissolved in the solvents to the hydrolysis water; a preliminary dispersion of a part or all of the solvents in the hydrolysis water can be produced before the halosilanes are added thereto. It is recommended that a reaction mixture temperature of 90° C. is not exceeded during this operation.

When the cohydrolysis is complete, the aqueous phase is removed and the organic phase is washed with water until neutral. The organic phase contains the methylphenylpolysiloxane resins; the latter, still relatively uncondensed, are naturally in the form of solutions in the organic solvents used for the cohydrolysis. However, other organic solvents which are poorly miscible or immiscible with water may be added upon completion of the cohydrolysis or during the washing.

These resins are then preconditioned, that is to say, precrosslinked by condensation of some of the SiOH radicals contained therein. This preconditioning can be carried out merely by heating to a temperature above 80° C.; the water of condensation is then removed as it is formed, by azeotropic distillation or by entrainment with the solvent vapor, the solvent being recycled to the reaction medium. The preconditioning can be completed, or even carried out as a whole, by heating in the presence of a condensation and rearrangement catalyst selected from among carboxylic acid salts of lead, zinc, iron and cobalt and iron (ferric) and zinc chlorides.

Preferably, salts of monocarboxylic acids containing from 4 to 12 carbon atoms, such as zinc hexanoate, zinc 2-ethylhexanoate, zinc octoate and zinc dodecanoate are used. The amount of salt used must be sufficient to provide from 50 to 6,000 parts of metal per million parts of resin solution. These solutions can be adjusted to the required resin concentration by removal or addition of solvents, this operation being carried out before the preconditioning, during the preconditioning, or after the preconditioning. Usually, the solutions obtained contain from 30 to 85% of resins, preferably 35 to 80%, and their viscosity is on the order of 20 to 3,500 mPa.s at 25° C.

The finely divided silicas (B) are used in a proportion of 3 to 25 parts, preferably 4 to 20 parts, per 100 parts of methylphenylpolysiloxane resins (A). They are selected from among pyrogenic silicas, precipitated silicas and silica aerogels; they have a mean particle diameter of less than 0.1 $\mu$m and their BET specific surface is greater than 40 m$^2$/g, in most cases ranging from 100 to 380 m$^2$/g.

The aluminum powders (C) are used in a proportion of 5 to 45 parts, preferably 10 to 40 parts, per 100 parts of methylphenylpolysiloxane resins (A). They are flaky particles having a mean diameter which is generally in the range of 1 to 20 $\mu$m. They can be used as such; it is recommended, however, that pastes of these powders be used in the usual, silicone-compatible organic solvents such as aliphatic and/or aromatic petroleum hydrocarbon cuts distilling, for example, within the range 120° C.–300° C., or toluene, xylene, tetralin, decalin, butyl acetate, cyclohexane and methylcyclohexane.

The concentration of the aluminum powders in these pastes is on the order of 40 to 80% by weight. Preferably, aluminum powders are used having flake-forming properties, obtained, for example, as a result of wet milling in the presence of solvents and stearic acid. These properties endow the particles with the ability to orient themselves and to float at the surface of the coatings in such a manner that they produce a visual impression of a continuous metallic surface; the flake value, measured according to the DIN Standard 55 923, is at least 65% for a test specimen of 2 to 3 g. Simultaneously, the powders have a hiding power over water, also measured according to DIN Standard 55 923, on the order of 12,000 to 65,000 cm$^2$/g.

In addition to components (A), (B) and (C), there may be used dimethylpolysiloxane oils (D) blocked by a trimethylsiloxy radical at each end of their polymer chain, having a viscosity of 100 to 3,000 mPa.s at 25° C.; they are added in a proportion of 0.1 to 5 parts, preferably 0.15 to 4.7 parts, per 100 parts of methylphenylpolysiloxane resins (A). They are principally used to enhance the nonadhesive properties of the coatings resulting from the curing of the compositions of the invention.

The preparation of the compositions according to the invention is carried out simply by mixing the components (A), (B), (C) and, if appropriate, (D) with the aid of conventional apparatus.

The order in which the various components are added may be any whatever; however, it is recommended that the silica (B) is first properly dispersed in the solutions of resins (A) and that the aluminum powders (C) are then added, followed by the oils (D), if appropriate.

In order to obtain good hardness when heated, it is necessary to add the silicas (B) in accordance with the above-mentioned amounts of 3 to 25 parts and the aluminum powders (C) in accordance with the above-mentioned amounts of 5 to 45 parts per 100 parts of resins (A); this is a first requirement. The second requirement is that these amounts should provide a weight ratio (B)+(C)/(A) which is in the range 0.15 to 0.50, preferably 0.20 to 0.45.

Lastly, it is recommended that the compositions obtained contain from 15 to 60% solids, preferably 20 to 55%; they can thus be readily diluted and homogenized. To obtain these values, diluting agents are added, if necessary, to (A), (B), (C) and, if appropriate, (D), when they are mixed together, or after they have been mixed.

The compositions defined in this manner are stable in storage in closed containers and, in particular, they do not gel. In this form, or when diluted up to tenfold, for example, they are applied to any heat-stable substrates, such as metals, glass, cement or brick. The usual means of application are employed, such as dipping, a brush, a roller, a spray gun, electrostatic spraying and printing. The deposited layers are heated to a temperature on the order of 100° to 350° C. for 1 to 5 hours.

The coatings obtained have a thickness which is in the range of 45 to 50 μm. They have a high hardness when heated; thus, at 200° C. their pencil hardness is higher then F (ECCA-TA-1977 test method) and their Persoz pendulum hardness is greater than 150 seconds (ISO pendulum hardness is greater than 150 seconds (ISO Standard 1522).

The coatings have a remarkable resistance to heat; in particular, they retain their physical characteristics at temperatures above 250° C. In addition, they are markedly nonadhesive towards sticky or crust-forming substances. This property of nonadhesiveness is retained both in the hot and cold states. As a result of this, these coatings are perfectly suitable as nonadhesive coatings on cooking utensils such as glass, enamelled and metal dishes, frying pans, casseroles, cooking pots, etc. They ensure that these utensils are easily cleaned and this is ensured over a period of prolonged use due to their good hardness when heated, which prevents them from deteriorating over a period of time, in particular because of contact with metal objects such as forks, knives, etc.

In order to further illustrate the present invention and the advantages thereof, the following specific example is given, it being understood that same is intended only as illustrative and in nowise limitative.

EXAMPLE 1,500 cm$^3$ of water were introduced into a round glass flask fitted with a stirrer and a thermometer pocket. Stirring was commenced and a toluene solution of chlorosilanes consisting of 194 g of $(CH_3)_2SiCl_2$, 521 g of $C_6H_5SiCl_3$ and 1,100 cm$^3$ of toluene was added to the flask by means of a dropping funnel. The addition required approximately 2 hours, during which the temperature was maintained below 80° C. The acidic water was separated off and the toluene layer was washed with water until neutral. This layer was heated under reflux and the water of condensation was removed by entrainment with the toluene as it was formed. When water ceased to be formed, the toluene layer was concentrated by distilling a part of the toluene at a reduced pressure of 600 to 650 millibars, such as to produce a solution containing 70% solids.

65 g of toluene and 0.32 g of an 8% strength xylene solution of zinc 2-ethylhexanoate were added to 121.5 g of the above-mentioned solution containing 70% solids.

The mixture was concentrated by distilling a part of the toluene until a solution containing 87% solids was obtained, and then it was heated under reflux. During this heating, water was removed as it was formed and the viscosity of the solution increased. When this viscosity reached 450 mPa.s at 25° C., the condensation operation was terminated. Sufficient toluene was then added to give a solution containing 50% solids, that is to say, 50% of a methylphenylpolysiloxane resin.

The solution had a viscosity of about 45 mPa.s at 25° C., the concentration of hydroxy radicals bonded to silicon atoms was 3% based on the resin and the concentration of zinc was 0.03%, also based on the resin.

The methylphenylpolysiloxane resin had a $(CH_3+C_6H_5)/Si$ ratio on the order of 1.4 and a $C_6H_5/Si$ ratio on the order of 0.60.

100 parts of the solution of methylphenylpolysiloxane resin containing 50% solids were milled, using a planetary mill, with 5 parts of a pyrogenic silica having a BET specific surface of 300 m$^2$/g for 3 hours at ambient temperature.

The dispersion obtained was placed in a vat fitted with a turbine stirrer; the stirrer was switched on and the following materials were added in succession into the vat, over a period of 20 minutes:

20 parts of a paste containing 65% by weight of a flaky aluminum powder and 35% of 140/195 white spirit, 0.5 part of a dimethylpolysiloxane oil blocked with a trimethylsiloxy radical at each end of its polyme chain, having a viscosity of 300 mPa.s at 25° C.

45.5 parts of xylene were then added; this resulted in the formation of a homogeneous, grey-pigmented paint having a pigment/binder ratio of 0.36 and a solids content of approximately 40%.

The characteristics of the aluminum pigment used in the paste were as follows:

(i) The mean size of the aluminum particles was 5 μm.

(ii) 99.9% of the particles were below 45 μm in size (according to the DIN Standard 53 196, applied to the screening).

(iii) The hiding power on water was 30,000 to 33,000 cm$^2$/g (according to the DIN Standard 55 923).

(iv) The flake-forming value was at least 65% for a test specimen of 2 g (also according to the DIN Standard 55 923).

The homogeneous grey-pigmented paint was applied by spraying onto a degreased steel plate; the uniform layer deposited was then heated gradually up to 300° C. and was maintained at this temperature for 2 hours. The coating obtained, matte grey in color, had a thickness on the order of 20 μm.

The plate was placed on a heating plate heated to 200° C.; the pencil hardness and the Persoz pendulum hardness of the plate coating were measured at this temperature of 200° C., and the values found were:
Pencil hardness: H
Persoz pendulum hardness: 160–180 seconds.

Furthermore, the nonadhesive nature of the coating was then determined using the following procedure:

An adhesive tape of trademark TESA 4330 was applied to the coating and the tape was subjected to a pressure of 2 kg/cm$^2$. The composite assembly of steel plate, coating and adhesive tape was placed in an oven heated at 150° C. for 20 hours. At the end of this period, the tape was detached by peeling with the aid of a tensometer and a peeling force of 200 g/cm was found.

A grey-pigmented paint was manufactured using the same components as those listed above, except that 180 parts of the solution of methylphenylpolysiloxane resin was used, having a pigment/binder ratio of 0.20 and a solids content of approximately 43%.

The procedure indicated above was used to measure the hardness of the coating produced using this paint, as well as its nonadhesiveness; the values found were:
Pencil hardness: H
Persoz pendulum hardness: 170 seconds
Peeling force: 240 g/cm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter, comprising:
   (A) 100 parts of a methylphenylpolysiloxane resin, in organic solvent solution, which comprises recurring units of the formulae $CH_3SiO_{1.5}$, $(CH_3)_2SiO$, $(C_6H_5)CH_3SiO$, $C_6H_5SiO_{1.5}$ and $(C_6H_5)_2SiO$, distributed in a $C_6H_5/Si$ ratio of 0.3 to 0.85 and a $(C_6H_5+CH_3)/Si$ ratio of 1.1 to 1.65, and having a concentration of hydroxyl groups bonded to silicon atoms of 0.5 to 9%;
   (B) 3 to 25 parts of a finely divided silica having a BET specific surface of at least 40 $m^2/g$; and
   (C) 5 to 45 parts of aluminum powder, with the proviso that the weight ratio $[(B)+(C)]/(A)$ ranges from 0.15 to 0.50

2. The organopolysiloxane composition as defined by claim 1, said silica (B) comprising pyrogenic silica, precipitated silica or a silica aerogel.

3. The organopolysiloxane composition as defined by claim 1, said aluminum powder (C) comprising flaky particles having a mean diameter ranging from 1 to 20 μm.

4. The organopolysiloxane composition as defined by claim 1, said aluminum powder (C) comprising a paste thereof in a silicone-compatible organic solvent.

5. The organopolysiloxane composition as defined by claim 1, further comprising from 0.1 to 5 parts, per 100 parts of resin (A), of a dimethylpolysiloxane oil (D) blocked by a trimethylsiloxy radical at each end of the polymer chain and having a viscosity of 100 to 3,000 mPa.s at 25° C.

6. The organopolysiloxane composition as defined by claim 1, the $C_6H_5/Si$ ratio in said methylphenylpolysiloxane resin (A) ranging from 0.40 to 0.80, and the $(C_6H_5+CH_3)/Si$ ratio ranging from 1.20 to 1.60.

7. The organopolysiloxane composition as defined by claim 1, having a solids content ranging from 15 to 60%.

8. A storage-stable package comprising the organopolysiloxane composition as defined by claim 1 sealedly enclosed within a packaging member therefor.

9. A substrate coated with a thin layer of the organopolysiloxane composition as defined by claim 1.

10. The substrate as defined by claim 9, said organopolysiloxane coating being heat-cured.

11. A matte paint comprising the organopolysiloxane composition as defined by claim 1.

* * * * *